United States Patent Office 3,553,168
Patented Jan. 5, 1971

3,553,168
POLYMER COMPOSITIONS
Harry A. Smith, Midland, Mich., assignor to The Dow Chemical Company, Midland, Mich., a corporation of Delaware
No Drawing. Filed Apr. 14, 1969, Ser. No. 816,056
Int. Cl. C08g 15/00
U.S. Cl. 260—63                           11 Claims

ABSTRACT OF THE DISCLOSURE

The present invention is a polymer composition characterized by the formula:

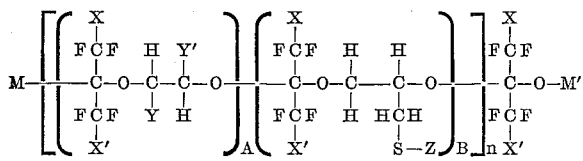

wherein X and X' are hydrogen, fluorine, chlorine or halogenated or unsubstituted alkyls of up to 6 carbon atoms; Y and Y' are hydrogen or alkyls having a combined total of up to 12 carbon atoms; Z is an alkyl of up to 12 carbon atoms; M is selected from the group consisting of alkali metal oxide, halogen, cyano and ester; M' is an alkali metal; the relative molar proportions of A to B are from 0/100 to 99/1 and n is an integer representing the degree of polymerization having a value of at least 1.

BACKGROUND OF THE INVENTION

It is known that polymers of halogenated ketones and epoxides burn slowly or are self-extinguishing when the polymers have relatively low melting points, i.e. less than about 100° C. Incorporation of thioepoxides into these polymers to form the terpolymer makes these material non-ignitable in an ordinary flame.

The terpolymers containing the thioepoxide, while having the desirable property of non-ignitability, may not be prepared with the desired molecular weight due to self initiation of the reaction during their preparation. I have discovered that the problem of excessively low molecular weights in the polymers above described is minimized by substitution of an alkyl glycidyl thioether for the thioepoxide with no reduction in the fire retardant properties of the composition.

It is an object of the present invention to provide polymeric composition which is non-ignitable in an ordinary flame.

It is another object to provide a process for preparing such a composition wherein the process conditions may be altered to control the molecular weight of the polymer.

SUMMARY OF THE INVENTION

The invention relates to polymeric compositions characterized by the formula:

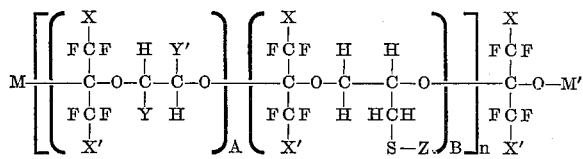

wherein X and X' are hydrogen, fluorine, chlorine or halogenated or unsubstituted alkyls of up to 6 carbon atoms; Y and Y' are hydrogen or alkyls having a combined total of up to 12 carbon atoms; Z is an alkyl of up to 12 carbon atoms; M is selected from the group consisting of alkali metal oxide, halogen, cyano and ester; M' is an alkali metal; the relative molar proportions of A to B are from 0/100 to 99/1 and n is an integer representing the degree of polyerization having a value of at least 1.

The compositions are prepared by reacting a polyhalo ketone characterized by the formula

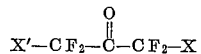

wherein X and X' are as defined above, with an alkylene oxide containing 2 to 14 carbon atoms and an alkyl glycidyl thioether having from 1 to 12 carbon atoms in the carbon side chain attached to the sulfur atom, in the presence of initiator. The initiator is selected from those substances which when contacted with the polyhaloketone form the corresponding alkoxide.

The reaction is carried out at a temperature within the range of from about 0° C. to about 100° C. for a time sufficient to permit the product to form.

DESCRIPTION OF PREFERRED EMBODIMENTS

In preferred embodiments of the present invention, an alkylene oxide is interpolymerized with the polyhalo ketone and glycidyl thioether to form the terpolymer.

Perhalo ketones containing from 3 to about 6 carbon atoms are preferred for use as the ketone with perfluoroacetone being the preferred species. Those alkylene oxides having from 2 to 4 carbon atoms, e.g. ethylene oxide, propylene oxide, butylene oxide (1,2-epoxybutane) and cis trans 2,3 epoxy butane are preferred for preparation of the terpolymers with ethylene oxide being the preferred species for solid polymers. Alkyl glycidyl thioethers in which the alkyl radical attached to the sulfur atom contains up to 6 carbon atoms are preferred with butyl glycidyl thioether being the preferred with butyl glycidyl thioether being the preferred species.

The terpolymers of the present invention comprise repeated groupings of the interpolymerization products of the polyhalo ketone, alkylene oxide and glycidyl thioether used as the reactants. The ratio of the interpolymerization product of the ketone to that of the combined alkylene oxide and glycidyl thioether moieties is 1:1. The degree of polymerization, $n$, represents the number of such repeated groupings. The softening point of the polymer is controlled by the type of alkylene oxide and the molecular ratio of alkylene oxide to glycidyl thioether. At ratios of ethylene oxide to glycidyl thioether of less than about 3:2 the terpolymers are non-crystalline and flowable at room temperatures. As the ratio of ethylene oxide to glycidyl thioether becomes greater than about 3:2 and the degree of polymerization is such that $n$ has a value of greater than about 10, the products are solids at room temperature. The softening points of these solids increases as the molecular ratio of ethylene oxide to glycidyl thioether increases.

The polymeric compositions of the present invention are prepared by contacting the polyhalo ketone, alkyl glycidyl thioether and optionally the alkylene oxide in the presence of an initiator. Initiators are those materials which when contacted with the ketone will form the corresponding alkoxide. Useful initiators are the alkali metals, and alkali metal oxides, halides, cyanides and carboxylates. The fluorides or oxides of cesium, rubidium and potassium are preferred for use as initiators in the process. The degree of polymerization may be adjusted by controlling the amount of initiator which is employed. Normally the initiator is employed in an amount equal to from about 10 to about .001 mole percent of the ketone used. For example, when the mole ratio of initiator to ketone is 1:200, the theoretical degree of polymerization, i.e. value of $n$ in the previous formula, will be about 200. The average degree of polymerization will be generally equal to the mole ratio of initiator to ketone under ideal conditions. However small amounts of water present in the reaction vessel will result in a degree of polymerization lower than that which would be predicted. The effect of water on the reaction is increased when the amount of alkylene oxide employed as a reactant becomes greater. Therefore, when high molecular weight polymers containing substantial amounts of alkylene oxide are desired, great care should be taken to minimize the amount of water present. In general, the degree of polymerization may be varied to yield polymers in which $n$ has a value of from about 1 to greater than 100,000 depending on the amount of initiator used. Those compositions in which the degree of polymerization is from about 100 to 10,000 are preferred.

When the copolymer of the ketone and glycidyl thioether is to be prepared, the ratios of of the reactants is not critical. A ratio of 1:1 is preferred for most economical conversion. When the terpolymer is desired as the final product, an excess of the combination of alkylene oxide and glycidyl thioether over the polyhaloketone is normally employed. An excess of at least about 2:1 is employed for efficient conversion. The glycidyl thioether reacts more readily than does the ethylene oxide. In order to incorporate alkylene oxide into the polymer it should be employed in an excess over the glycidyl thioether. When it is desired to prepare the terpolymer in which the relative molar proportion of alkylene oxide to glycidyl thioether is greater than about 60/40 the molar ratio of alkylene oxide to glycidyl thioether employed as reactants should be at least about 9:1:

In carrying out the present process, the reactants are normally sealed in a reaction vessel at a temperature of from about $-196°$ C. to about $-70°$ C. The temperature is increased to the desired reaction temperature. Under these conditions the polyhaloketone is dissolved in the excess alkylene oxide-glycidyl thioether solution. In general, the reaction may be carried out at a temperature of from 0° C. to 100° C. with 0 to 50° C. being preferred. By controlling the amount of initiator employed, the degree of polymerization can be controlled. In general, the reaction will go to completion, i.e. the reactant not in excess will become exhausted in about 12 to 600 hours. Pressure is not critical; autogenous is preferred.

It is highly desirable that the reaction be conducted under substantially anhydrous conditions as the presence of even minor amounts of water has a detrimental effect on both the rate of and degree of polymerization.

The polymer compositions of the present invention find particular utility as fire retardant coatings. They are soluble in acetone and 1,1,1-trichloroethane and may be applied from such solvents to substrates to decrease the ease with which such substrate can be ignited. The solvent is evaporated to leave a residual coating of the polymer.

The following example will serve to further illustrate the invention.

EXAMPLE I

Into oven dried ampoules were placed mixtures containing relative molar proportions of hexafluoro acetone (HFA)/ethylene oxide (EO)/butyl glycidyl thioether (BGTE) ranging from 100/0/100 to 42/95/05. Cesium fluoride, in an amount sufficient to provide a mole ratio of 1:200 to the hexafluoroacetone used, was employed as the initiator in each run. The various compositions were mixed at $-196°$ C., sealed in the glass ampoules and brought to room temperature. After reaction at room temperature for 48 hours, the ampoules were cooled to $-196°$ C., opened and the volatiles removed by vacuum distillation, leaving the polymer as a residue. The polymer composition was then determined by elemental analysis. The percent yield was determined with hexafluoroacetone as the limiting reactant. The average molecular weights of the products of runs 1 and 5 were determined by bulliometry. In run number 1 the water content of the epoxides was 3.6% and in run number 5 the water content was 1.2%. The results of these experiments are shown in the following Table I. It will be noted that as the relative proportion of ethylene oxide increases, the percent yield decreases. This is due to the reactivity of ethylene oxide being substantially lower than the butyl glycidyl thioether and the subsequent reaction not going to completion in the 48-hour reaction period.

TABLE I

| Sample No. | Relative molar proportions of reactants, HFA/EO/BGTE | Softening point ° C. | Average number molecular weight | Polymer comp. relative molar proportions, HFA/EO/BGTE | Yield, percent | Polymer description |
|---|---|---|---|---|---|---|
| 1 | 100/0/100 | Flowable at room temperature. | 480 | 100/0/100 | 92.0 | Colorless gum. |
| 2 | 42/50/50 | ___do___ |  | 100/0/100 | 85.0 | Do. |
| 3 | 42/75/25 | ___do___ |  | 100/5/95 | 61.0 | Do. |
| 4 | 42/85/15 | ___do___ |  | 100/20/80 | 52.0 | Do. |
| 5 | 42/90/10 | 25–74 |  | 100/60/40 | 28.0 | White solid. |
| 6 | 42/95/05 | 25–83 | 500 | 100/77/23 |  | Do. |

In a manner similar to that of Example I, the polymers are prepared by using in place of the reactants specified above one or more of the following:

(a) polyhalo ketones characterized by the formula

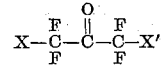

wherein X and X' are hydrogen, fluorine, chlorine or halogenated or unsubstituted alkyl groups containing up to six carbon atoms such as, for example:

1,1,3,3-tetrafluoropropanone;
2,2,4,4-tetrafluoro-3-pentanone;
1,1,2,2,4,4,5,5-octafluoropentanone;
perfluoropentanone;
2,2,4,4-tetrafluoro-1,1,5,5-tetrachloro-3-pentanone;
1,1,3,3-tetrafluoro-2-pentanone;
3,3,5,5-tetrafluoro-4-heptanone;
3,3,5,5-tetrafluoro-1,1,1,2,2,6,6,7,7,7-decachloro-4-heptanone;
perfluoroheptanone;
2,2,3,3,5,5,6,6-octafluoro-4-heptanone;
2,2,4,4-tetrafluoro-3-heptanone;
4,4,6,6-tetrafluoro-5-decanone;
2,3,4,4,6,6,7,8-octafluoro-5-decanone;
2,3,7,8,9-pentachloro-4,4,6,6-tetrafluoro-5-decanone;
3,3,5,5-tetrafluoro-7,7,8,9-tetrachloro-4-decanone;
perfluorodecanone;
3,3,5,5-tetrafluoro-4-tridecanone;
2,2,6,6,7,8-hexachloro-3,3,5,5-tetrafluoro-4-tridecanone;
6,6,8,8-tetrafluoro-7-tridecanone;
3,4,5,9,9,10,11,12-octachloro-6,6,8,8-tetrafluoro-7-tridecanone;
1,1,1,3,3-pentafluoro-2-tridecanone;
4,5,6,7,7,8,8,9,12,12-decachloro-1,1,3,3-tetrafluoro-2-tridecanone and perfluorotridecanone.

(b) an alkylene oxide containing up to 14 carbon atoms, e.g. propylene oxide, butylene oxide, (1,2-epoxybutane), cis and trans 2,3 epoxy butane, heptalene oxide, and tetradecylene oxide; and (c) an alkyl glycidyl thioether wherein the alkyl group attached to the sulfur atom contains from 1 to 12 carbon atoms, e.g. methyl glycidyl thioether, pentyl glycidyl thioether, heptyl glycidyl thioether, decyl glycidyl thioether and dodecyl glycidyl thioether.

I claim:

1. A polymer composition consisting essentially of the formula:

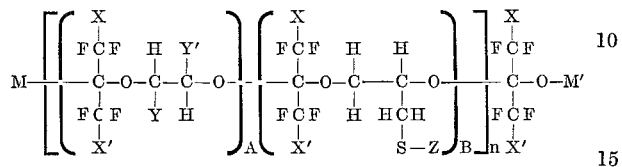

wherein X and X' are hydrogen, fluorine, chlorine or halogenated or unsubstituted alkyls of up to 6 carbon atoms; Y and Y' are hydrogen or alkyls having a combined total of up to 12 carbon atoms; Z is an alkyl of up to 12 carbon atoms; M is selected from the group consisting of alkali metal oxide, halogen and cyano; M' is an alkyli metal, the relative proportions of A to B are 0/100 to 99/1, and $n$ is an integer representing the degree of polymerization having a value of at least 1.

2. The composition of claim 1 wherein X and X' are fluorine Y and Y' are hydrogen and Z is butyl.

3. The composition of claim 2 wherein M is fluorine and M' is potassium, cesium or rubidium.

4. The composition of claim 3 wherein $n$ has a value of from about 100 to 10,000.

5. The composition of claim 1 wherein X and X' are alkyls having a combined total of about 3 carbon atoms, Y and Y' are hydrogen or methyl and Z is an alkyl containing 1 to 6 carbon atoms.

6. The composition of claim 5 wherein M is fluorine and M' is potassium, cesium or rubidium.

7. A process for preparing polymer compositions which comprises:

(a) contacting a polyhaloketone characterized by the formula

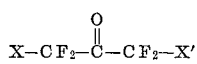

wherein X and X' are hydrogen, fluorine, chlorine or halogenated or unsubstituted alkyls of up to 6 carbon atoms with an alkyl glycidyl thioether having from 1 to 12 carbon atoms in the alkyl side chain attached to the sulfur atom and optionally an alkylene oxide containing 2 to about 14 carbon atoms wherein the relative molar proportion of ketone to alkylene oxide to glycidyl thioether reacted is within the range of from about 100/0/100 to about 100/99/1 in the presence of an initiator which when contacted with the ketone will form the corresponding alkoxide, said initiator, being employed in the amount of from about 10 to about .001 mole percent of the ketone used in the reaction, (b) maintaining the temperature within the range of from about 0° to 100° C. whereby the desired polymer is formed.

8. The process of claim 7 wherein the initiator is an alkali metal, an alkali metal oxide, an alkali metal halide or an alkali metal cyanide.

9. The process of claim 7 wherein the initiator is the oxide or fluoride of potassium, cesium or rubidium.

10. The process of claim 7 wherein the polyhalo acetone is perfluoroacetone; the alkylene oxide is ethylene oxide and the alkyl glycidyl thioether is butyl glycidyl thioether.

11. The process as defined in claim 10 wherein the temperature is maintained within a range of from about 0° to 50° C.

References Cited

UNITED STATES PATENTS 3,316,216  4/1967  Fawcett et al. _____ 260—63
3,468,847  9/1969  Doorenbos et al. _____ 260—63

HAROLD D. ANDERSON, Primary Examiner

L. L. LEE, Assistant Examiner

U.S. Cl. X.R.

117—161; 260—2, 32.8, 33.8, 79, 465.6, 609